United States Patent [19]

Tahara et al.

[11] Patent Number: 4,874,671
[45] Date of Patent: Oct. 17, 1989

[54] HEAT-RESISTANT ANTI-GLARE SCREEN

[75] Inventors: Kazutoki Tahara; Toshihiko Egawa, both of Saitama, Japan

[73] Assignee: Shin-Etsu Polymer Co., Ltd., Tokyo, Japan

[21] Appl. No.: 221,644

[22] Filed: Jul. 20, 1988

Related U.S. Application Data

[63] Continuation-in-part of Ser. No. 118,403, Nov. 9, 1987, abandoned, which is a continuation of Ser. No. 853,615, Apr. 18, 1986, abandoned.

[30] Foreign Application Priority Data

Apr. 22, 1985 [JP] Japan .................................. 60-86027

[51] Int. Cl.$^4$ .......................... B32B 5/14; B32B 25/20
[52] U.S. Cl. ..................................... 428/447; 428/215; 428/220; 428/412; 428/419; 428/480; 350/268; 350/276 R; 350/284; 358/252; 296/97.1; 296/97.2
[58] Field of Search ............... 428/447, 215, 220, 412, 428/419, 480; 358/252; 350/276 R, 268, 284; 296/97.1, 97.2, 97.7, 97.9

[56] References Cited

U.S. PATENT DOCUMENTS

| | | | |
|---|---|---|---|
| 2,053,133 | 9/1936 | Astime | 350/276 R |
| 3,312,574 | 4/1967 | Laur | 428/447 |
| 3,312,587 | 4/1967 | Wilson | 428/447 |
| 3,524,789 | 8/1970 | Olsen | 350/276 R |
| 3,909,524 | 9/1975 | Ohkosi et al. | 358/252 |
| 4,506,953 | 3/1985 | Shimizu et al. | 350/276 R |

FOREIGN PATENT DOCUMENTS

284740 12/1987 Japan .
2173736 10/1986 United Kingdom .

Primary Examiner—Thurman K. Page
Assistant Examiner—Susan S. Rucker
Attorney, Agent, or Firm—Hopgood, Calimafde, Kalil, Blaustein & Judlowe

[57] ABSTRACT

The anti-glare screen of the invention is composed of an anti-glaring base sheet which is a striped silicone rubber sheet formed of alternately disposed narrow sections of a transparent silicone rubber and a colored, e.g. black, and opaque silicone rubber, each section having a specified width, a transparent lining sheet bonded to one surface of the anti-glaring base sheet and a layer of a pressure-sensitive adhesive on the other surface of the anti-glaring base sheet. By virtue of the high heat resistance of the silicone rubbers, the anti-glare screen can be used to increase the visibility of any displays even when it is heated at an elevated temperature of up to 200° C. as in traffic signals illuminated with an incandescent lamp or as an anti-glare covering in front of a metering panels of automobile dashboards sometimes subject to extreme temperature elevation when the car is prolongedly parked under direct sun shine. Moreover, the transparent lining sheet having rigidity imparts shape retainability to the sheet so that the anti-glare screen can be adapted to any curved surface of display. The layer of the pressure-sensitive adhesive serves not only to facilitate attachment of the screen to the display surface but also to prevent the phenomenon of Newton's rings which otherwise is unavoidable more or less.

8 Claims, 1 Drawing Sheet

HEAT-RESISTANT ANTI-GLARE SCREEN

BACKGROUND OF THE INVENTION

This is a continuation-in-part application from a co-pending U.S. patent application Ser. No. 07/118,403 filed Nov. 9, 1987, now aband, which is a continuation application of a now abandoned U.S. patent application Ser. No. 06/853,615 filed Apr. 18, 1986.

The present invention relates to a heat-resistant anti-glare screen or, more particularly, to an anti-glare screen having good heat resistance suitable for mounting in front of various kinds of light-emitting display screens with an object to enhance the contrast and visibility of the displayed images and to reduce glaringness of the images to the viewer's eyes with adjustability of the visual angle.

An anti-glare screen having adjustability of the visual angle can be well comprehended when one imagines a venetian blind having a number of vanes arranged at a variable angle and installed on a window so as to shield the sun light most effectively by appropriately rotating the vanes. Apart from such devices used in buildings, a problem of glaringness is sometimes encountered in various kinds of display units such as cathode-ray tube screens and metering instruments giving information with luminescent images. Accordingly, several types of anti-glare or light-shielding screens have been proposed including those made of a sheet of cellulose acetate butyrate provided with a large number of minute vanes like louvers. When such a screen is mounted in front of the display unit, incidence of extraneous outer light on the display screen is partially shielded within a range of angles so that the visibility of the display screen can be improved.

The above mentioned conventional anti-glare screen made of a sheet of cellulose acetate butyrate are disadvantageous due to their relatively low heat resistance so that they are subject to deformation or emission of gases having unpleasant odor when they are heated at a temperature of 70° to 80° C. or higher. For example, it is not rare that the room temperature of an automobile in long parking under direct sun light as in a tropical climate is increased to exceed the above mentioned temperature so that the anti-glare screen mounted on the metering instruments of the automobile may undergo or cause the above mentioned drawbacks. These drawbacks can be eliminated by replacing the sheet of cellulose acetate butyrate with a plate of an acrylic resin though at the sacrifice in other respects such as blooming of white dusts on the surface during use and the relatively large thermal expansion coefficient of $14 \times 10^{-5}$/°C. to cause a decrease in the dimensional stability at elevated temperatures.

When an anti-glare screen of a conventional type is attached to the front glass of a cathode-ray tube (CRT), a disadvantage is sometimes caused that a phenomenon of so-called Newton's rings appears to greatly decrease the visibility of the images displayed on the CRT screen. This problem is presumably due to the fact that the surface of the front glass of CRTs usually and unavoidably has certain irregularities or is warped so that perfectly intimate contact can rarely be obtained between the CRT screen and the anti-glare screen mounted thereon.

SUMMARY OF THE INVENTION

The present invention accordingly has an object to provide a novel anti-glare screen free from the above described problems and disadvantages, in particular, in respect of the heat resistance of the conventional anti-glare screen and the incomplete contacting between the surface of a CRT screen and the anti-glare screen mounted thereon. The anti-glare screen of the invention, which retains a curved configuration to comply with the curved surface of a light-emitting display screen to which the anti-glare screen is attached, comprises (a) a silicone rubber-made anti-glaring base sheet integrally composed of alternately arranged narrow sections of a transparent silicone rubber and a colored and opaque silicone rubber disposed in a stripe-wise manner, (b) a transparent lining sheet of a thermoplastic resin integrally bonded to one surface of the anti-glaring base sheet of silicone rubbers and (c) a layer of a pressure-sensitive adhesive formed on the surface of the anti-glaring base sheet of silicone rubbers not in contact with the transparent lining sheet of a thermoplastic resin.

Such a silicone rubber-made striped anti-glaring base sheet can be prepared by a method in which a number of uncured sheets of a transparent silicone rubber compound and a number of uncured sheets of a colored and opaque silicone rubber compound are alternately stacked one on the other into a stratified block which was cured by heating under an adequate pressure followed by slicing the cured block into sheets in parallel planes perpendicular to or, generally, not in parallel with the plane of the sheets in stratification.

DETAILED DESCRIPTION OF THE PREFERRED EMBODIMENTS

As is understood from the above given summarizing description, the anti-glaring base sheet of the inventive anti-glare screen is made of two types of silicone rubbers, one being transparent and, usually, colorless and the other being deep-colored and opaque. Several grades of silicone rubber compounds capable of giving a transparent vulcanizate are commercially available including those compounds curable with an organic peroxide compounded therein as a curing agent and those compounds curable by the addition reaction or so-called hydrosilation reaction between an organopolysiloxane having, in a molecule, at least two silicon-bonded vinyl groups and an organohydrogenpolysiloxane having, in a molecule, at least three silicon-bonded hydrogen atoms in the presence of a platinum compound as a curing catalyst.

The deep-colored and opaque silicone rubber combined with the above mentioned transparent silicone rubber is usually colored in black or other deep color by admixing a silicone rubber compound with a pigment having masking power such as carbon black. Sufficiently colored silicone rubber compounds can be obtained by admixing a transparent or light-colored silicone rubber compound with 5 to 10% by weight of a carbon black or other deep-colored pigment.

Figure 1:
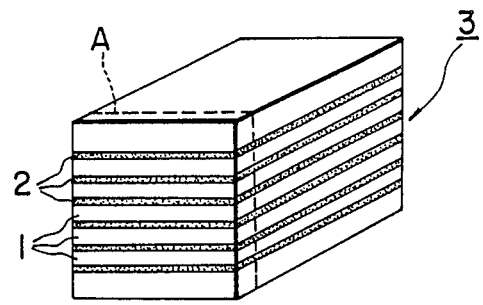
FIG. 1 is a perspective view of a stratified block formed of alternate layers of transparent silicone rubber sheets and colored and opaque silicone rubber sheets and FIG. 2 is a perspective view of an anti-glaring base sheet used in the anti-glare screen of the invention.
Figure 2:
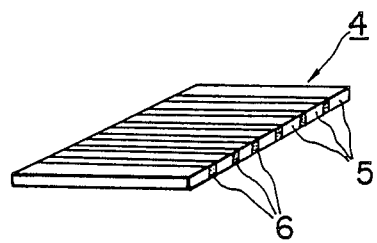

These transparent and colored silicone rubber compounds are each shaped into thin sheets by a suitable sheeting method and the sheets are stacked in an alternate stratification of transparent silicone rubber sheets 1 and colored silicone rubber sheets 2 to form a stratified block 3 illustrated in FIG. 1 by a perspective view. It is of course that the transparent sheets and the colored and opaque sheets may have the same thickness or different thickness from each other. The thus prepared stratified block 3 is then subjected to curing by heating under a compressive force in the direction perpendicular to the stratified layers into a cured block. The thus obtained cured and stratified block 3 is then sliced in parallel planes A in FIG. 1 into sheets each serves as an anti-glaring base sheet 4 used in the inventive anti-glare screen. FIG. 2 illustrates a perspective view of such an anti-glaring base sheet obtained in this manner as composed of alternately disposed sections 5 of the transparent silicone rubber and the sections 6 of the colored and opaque silicone rubber to give a stripe-wise appearance. The interface planes between the adjacent transparent sections 5 and colored and opaque sections 6 are all in parallel with each other. The direction of the slicing planes is not limited to a direction perpendicular to the plane of the stratified layers but at any biased direction not in parallel with the plane of the stratified layers. As is readily understood, the slicing of the stratified block 3 at a biased direction gives anti-glare base sheets which transmit the light in directions only in a range of biased angles so as to give the best viewing effect to the viewers of the display unit having the anti-glare screen mounted in front thereof depending on the relative positions of the display unit and the viewer's eyes.

Since silicone rubbers in general are highly heat-resistant, the anti-glaring base sheet used in the inventive anti-glare screen can withstand a temperature up to about 250° C. or, usually, up to 200° C. without the drawbacks of thermal deformation or emission of noxious gases. The anti-glare screen should desirably be so wide as to cover the whole front surface of the display unit such as cathode-ray tubes, metering instruments and panel boards using light-emitting diodes, liquid-crystal displays and other luminescent means in order to give full anti-glare effects by limiting the light reaching the viewer's eyes. The thickness of the anti-glaring base sheet should be in the range from 0.15 mm to 2.5 mm in consideration of various parameters such as the visual angle, % light transmission as desired and convenience in handling. While the percentage of light transmission through the screen is largely determined by the ratio of the width $W_1$ of each section of the transparent silicone rubber 5 to the width $W_2$ of each section 6 made of the colored and opaque silicone rubber, i.e. $W_1:W_2$, and the range of the visual angle is determined by the refractive index n of the transparent silicone rubber, width of the transparent section $W_1$ and thickness of the screen t, the value of $W_1$ should be in the range from 0.05 to 0.3 mm or, preferably, from 0.075 to 0.2 mm. The width $W_2$ of the opaque and colored section 6 should be in the range from 0.01 to 0.05 mm or, preferably, from 0.015 to 0.03 mm in order to avoid offensiveness to the viewer's sight. When these parameters are satisfied, a light transmission of up to 85% and a visual angle in the range from 3° to 120° or, preferably, from 40° to 100° or, more preferably, from 45° to 90° can be obtained in the anti-glare screen of the invention.

As is mentioned before, the cured stratified block of the silicone rubbers can be sliced in parallel at a biased angle to give a visual angle unsymmertrical relative to the normal to the plane of the anti-glaring base sheet or the inventive anti-glare screen. Such an anti-glare screen having a biased visual angle is particularly useful when the display unit, on which sun light directly shines, must be looked up at with an object to shield the sun light and increase visibility of the display as in traffic signals. Although the angle by which the slicing planes are biased is not particularly limitative according to the particular purpose and situation, it is usually in the range from 3° to 15° from the practical standpoint.

Figure 3:
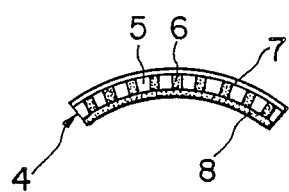
FIG. 3 is a cross sectional view of the inventive anti-glare screen composed of a silicone rubber-made anti-glaring base sheet sandwiched between a transparent lining sheet of a thermoplastic resin and a layer of a pressure-sensitive adhesive.

It is essential in the inventive anti-glare screen that the anti-glaring base sheet 4 is lined or sandwiched using a sheet or sheets 7 of a transparent thermoplastic resin as is illustrated in FIG. 3 by a cross sectional view with an object to increase the mechanical strengths of the base sheet 4 and also to impart retainability of a curved configuration of the base sheet 4 so as to comply with the curved surface of a light-emitting display screen as is usually the case in cathode-ray tubes. In this regard, the transparent lin-ing sheet 7 should have a thickness in the range from 0.05 to 5.0 mm or, preferably, from 0.1 to 2.0 mm or, more preferably, from 0.1 to 0.6 mm. When such a curved configuration is desired of the inventive anti-glare screen, a transparent lining sheet 7 of a thermoplastic resin coated with a transparent adhesive is laid on the anti-glaring base sheet and they are pressed together in a metal mold having a desired curvature with heating so that the base sheet 4 and the lining sheet 7 are integrally bonded together by use of a pressure-sensitive or curable adhesive into a curved configuration. The lining sheet 7 also should preferably have heat resistance to withstand a temperature of 200° C. or higher. In this regard, the transparent plastic material for the lining sheet 7 is preferably made of a polyester, polysulfone, polycarbonate, unplasticized poly(vinyl chloride), polyarylate, polyamide, polypropylene, poly(methyl methacrylate) and the like resin, of which polycarbonate, polyarylate, polyester and polysulfone are preferred. By this means, advantages are obtained in respect of the mechanical strengths such as tensile strength and tear strength. If necessary, the lining sheet is printed on either or both of the surfaces with desired auxiliary indicative marks or patterns for the display per se. When the inventive anti-glare screen is imparted with rigidity by using a transparent lining sheet 7 having rigidity, the anti-glare screen can be worked by punching or other mechanical means which otherwise cannot be used in working with a thin rubbery anti-glaring base sheet 4 alone. It is of course optional that the anti-glaring base sheet 4 is sandwiched between two transparent lining sheets 7 of a thermoplastic resin so as to be imparted with further increased mechanical strengths.

The surface of such a lining sheet facing the viewer's eyes should preferably be matted to decrease reflection of light thereon with a further increased anti-glare effect. The matting treatment of the surface of the plastic resin sheet can be performed in several ways. For example, the method of so-called plastic etching is applicable in this case, in which the surface of the plastic sheet is contacted with another plastic sheet containing an organic solvent, acid or alkali which may attack the plastic resin. Alternatively, the surface of the transparent plastic sheet 7 is imparted with mated appearance by embossing or by coating with a pasty dispersion of a fine silica powder in a solution of a synthetic resin having good transparency such as acrylic resins. Further, a matted surface can be formed by providing the surface of the plastic sheet with successive three coating layers including the first layer of aluminum oxide $Al_2O_3$ or cerium fluoride $CeF_3$, the second layer of a mixture of zirconium oxide $ZrO_3$ or $ZrO_2$ and titanium dioxide $TiO_2$ and the third layer of magnesium fluoride $MgF_2$ deposited by the method of vacuum vapor-phase deposition or other suitable means. The transparent plastic sheet having the thus matted surface may serve as a circularly polarizing plate of light.

It is of course advantageous that the transparent silicone rubber has a transparency as high as possible. The improvement in the transparency of a silicone rubber can be obtained by a precoating of the silica filler with a coating material having a refractive index close to that of the organopolysiloxane gum prior to compounding. Alternatively, an organopolysiloxane gum may have a refractivce index approximating to tthat of a silica filler when the organopolysiloxane contains a relatively large amount of phenyl groups. For example, a good result can be obtained when about 15% of moles of the organic groups in the organopolysiloxane are phenyl groups, the rest being methyl groups.

The thus prepared laminate of the anti-glaring base sheet 4 and the transparent lining sheet 7 or sheets is then coated with a pressure-sensitive adhesive to form an adhesive layer 8 on the surface facing to the light-emitting display screen or the surface reverse to the surface facing the viewer. Various kinds of pressure-sensitive adhesives can be used for the purpose. For example, examples of rubber-based pressure-sensitive adhesives include those solution-type ones composed of a rubbery base such as natural rubber, polyisoprene rubber, SBR, polyisobutylene, NBR, poly(vinyl ethers), poly(acrylic esters) and copolymers thereof, block copolymers of styrene and isoprene or styrene and butadiene and the like with a tackifier resin such as polyterpenes, rosins and derivatives thereof, oil-soluble phenolic resins, coumarone-indene resins, petroleum-based hydrocarbon resins and the like, optionally, with admixture of a plasticizer, filler, aging retarder, organic solvent and the like. Other types of pressure-sensitive adhesive include copolymers of which the principal comonomeric constituent is 2-ethylhexyl acrylate, n-butyl acrylate and the like copolymerized with a cohesiveness-imparting comonomer such as short-chain alkyl acrylates or methacrylate and vinyl acetate and a functional comonomer to provide crosslinking points such as acrylic acid, methacrylic acid, acrylamide and derivatives thereof, hydroxyethyl acrylate, glycidyl acrylate and the like. Preferably, the pressure-sensitive adhesive used in the inventive anti-glare screen is a silicone-based one such as those mainly composed of a poly(dimethyl siloxane) gum compounded with a low-molecular resinous silicone in respect of the heat resistance and durability in a long-term service.

The above mentioned pressure-sensitive adhesive layer 8 is very important in order to minimize the troubles due to the appearance of so-called Newton's rings when the anti-glare screen is directly attached to the surface of a light-emitting display screen such as cathode-ray tubes. The undesirable phenomenon of Newton's rings is more or less unavoidable in any cathode-ray tubes because the surface thereof is not a smoothly curved surface but more or less warped due to the distortion caused in the cooling procedure after glass blowing so that a very thin interstice is unavoidably formed between the surface of the cathode-ray tube and the anti-glare screen directly mounted thereon, especially, when the anti-glare screen has stiffness. When the surface of the anti-glare screen has a layer of a pressure-sensitive adhesive 8, the interstice between the cathode-ray tube and the anti-glare screen is readily filled up by the adhesive flowing plastically under pressure so as to prevent appearance of the Newton's rings. In this regard, the layer of the pressure-sensitive adhesive should have a thickness in the range from 0.01 to 0.1 mm or, preferably, in the range from 0.02 to 0.08 mm. Moreover, it is desirable that the pressure-sensitive adhesive has a refractive index which is the same as or as close as possible to that of the transparent and colorless silicone rubber forming the light-transmitting regions in the anti-glaring base sheet.

Since the principal component of the inventive heat-resistant anti-glare screen is a silicone rubber-made anti-glaring base sheet, the inventive anti-glare screen is highly heat-resistant to withstand a temperature of up to 200° C. without the disadvantages of thermal distortion or emission of noxious gaseous decomposition products so that the anti-glare screen can be used even in the proximity of an incandescent lamp for the illumination of a display unit. The inventive anti-glare screen is also useful for mounting in front of the dashboard panels of automobiles since the inventive screen can withstand a temperature as high as 110° C. or higher encountered not rarely in the room of an automobile prolongedly parked under scorching sun with absolute absence of any adverse influences on other transparent materials such as acrylic resins used inside the automobile room. When the inventive anti-glare screen is mounted in front of a display unit installed outdoors, the incident sun light can be efficiently shielded so that the display image is imparted with greatly enhanced contrast to improve the visibility. When the inventive anti-glare screen is mounted in front of a metering panel in a dark room or in front of an automobile dashboard, the advantage thereby is not limited to shielding of incident outer light but any extraneous inside light emission can be prevented from forming virtual images on the windshield relative to the visual angle.

In the following, the heat-resistant anti-glare screen of the invention is described in more detail by way of an example.

EXAMPLE 1

A transparent silicone rubber compound (KE 164U, a product by Shin-Etsu Chemical Co.) was shaped into sheets each having a thickness of 0.240 mm. Separately, black silicone rubber sheets each having a thickness of 0.040 mm were prepared from a uniform blend of 100 parts by weight of a silicone rubber compound (KE 981U, a product by the same company, supra) and 5 parts by weight of carbon black. These two types of silicone rubber sheets were stacked alternately one on the other into a height of 350 mm and the thus obtained block was heated at 180° C. for 10 minutes under a pressure of 100 kg/cm$^2$ in the direction perpendicular to the plane of the stacked rubber sheets so that the silicone rubber sheets were cured and integrated into a stratified block.

The stratified silicone rubber block was sliced in parallel planes in a direction perpendicular to the plane of the layers to give striped silicone rubber sheets of 0.4 mm thickness having mat surfaces. The transparent and black stripes each had a width of 0.240 mm and 0.040 mm, respectively, so that the light shielding through this anti-glaring base sheet was $40/(240+40)\times 100 = 14.3\%$.

The above obtained anti-glaring base sheet was laminated on one surface with a transparent and colorless polycarbonate resin sheet having a thickness of 0.3 mm and imparted by molding in a metal mold with a curved configuration which could best comply with the curved surface of cathode-ray tubes. One of the surface of the polycarbonate sheet, which was reverse to the anti-glaring base sheet, was matted in order to reduce reflection of light. The other surface of the anti-glaring base sheet was coated with a transparent and colorless silicone rubber-based pressure-sensitive adhesive in a coating thickness of 0.1 mm. The thus prepared anti-glare screen of the invention could easily be attached to the surface of a cathode-ray tube screen by utilizing the pressure-sensitive adhesive without appearance of Newton's rings so that a great improvement could be obtained in the visibility of the images displayed on the cathode-ray tube screen.

What is claimed is:

1. An anti-glare screen which comprises (a) a silicone rubber-made anti-glaring base sheet integrally composed of alternately arranged narrow sections of a transparent silicone rubber and a colored and opaque silicone rubber disposed in a stripe-wise manner, (b) a transparent lining sheet of a thermoplastic resin integrally bonded to one surface of the anti-glaring base sheet of silicone rubbers and (c) a layer of a pressure-sensitive adhesive formed on the surface of the anti-glaring base sheet of silicone rubbers not in contact with the transparent lining sheet of a thermoplastic resin.

2. The anti-glare screen as claimed in claim 1 wherein the colored and opaque silicone rubber is a black silicone rubber admixed with carbon black.

3. The anti-glare screen as claimed in claim 1 wherein each of the sections made of a transparent silicone rubber forming the anti-glaring base sheet has a width in the range from 0.05 mm to 0.3 mm.

4. The anti-glare screen as claimed in claim 1 wherein each of the sections made of a colored and opaque silicone rubber forming the anti-glaring base sheet has a width in the range from 0.05 mm to 0.1 mm.

5. The anti-glare screen as claimed in claim 1 wherein the anti-glaring base sheet has a thickness in the range from 0.15 mm to 2.5 mm.

6. The anti-glare screen as claimed in claim 1 wherein the thermoplastic resin of the transparent lining sheet is selected from the group consisting of a polycarbonate resin, polyarylate resin, polyester resin and polysulfone resin.

7. The anti-glare screen as claimed in claim 1 wherein the transparent lining sheet has a thickness in the range from 0.05 mm to 5.0 mm.

8. The anti-glare screen as claimed in claim 1 wherein the layer of a pressure-sensitive adhesive has a thickness in the range from 0.01 mm to 0.1 mm.

* * * * *